United States Patent [19]

Belser

[11] Patent Number: 5,163,796
[45] Date of Patent: Nov. 17, 1992

[54] FASTENING BOLT ASSEMBLY PROVIDING BOTH AXIAL AND RADIAL HOLDING FORCES

[76] Inventor: Jess L. Belser, East Hill Farm, R.R. 4, Box 844, W. Guilford, Vt. 05301

[21] Appl. No.: 890,099
[22] Filed: May 29, 1992
[51] Int. Cl.⁵ .............................................. F16B 21/00
[52] U.S. Cl. .................................. 411/342; 411/371; 411/915
[58] Field of Search ............... 411/342, 340, 341, 345, 411/542, 371, 915

[56] References Cited

U.S. PATENT DOCUMENTS 2,771.262 11/1956 Laystrom ...................... 411/915 X
3,778,539 12/1973 Baier ............................ 411/542 X

FOREIGN PATENT DOCUMENTS 570534 12/1957 Italy ...................... 411/340

Primary Examiner—Rodney M. Lindsey
Attorney, Agent, or Firm—Sughrue, Mion, Zinn, Macpeak & Seas

[57] ABSTRACT

A tubular and preferably elastomeric radial holding and centering expandable bushing having a bore sized to pass a threaded shank of a fastening bolt and having a radially enlarged flanged one end thereof. The bore tapering outwardly toward the periphery to create a conical cavity between the bushing body from the flange rearwardly. The cavity receives a tubular expansion insert having a tapered periphery and internal bore slightly larger than the diameter of the threaded shank of the fastening bolt which insert is positioned to the side of the tubular bushing remote from the head of said fastening bolt. A folding wing nut structure includes a trunion nut having a tapped bore threaded on said shank of the bolt, axially outwardly of the tubular expansion insert to the side opposite to the tubular bushing. The structure includes a pair of foldable wings. Tightening down of the fastening bolt against a load mounted between the head of the fastening bolt and the outer surface of a wall having a blind hole sized to and receiving the body of the tubular bushing causes the trunion nut to move towards the tubular expansion insert and to drive the expansion insert into the conical cavity radially expanding the bushing to exert radial holding forces on the wall about the periphery of the blind hole. The open wings of the folding wing nut structure abut the rear face of the wall to create axial forces tending to fixedly mount the object against the front surface of the wall.

10 Claims, 1 Drawing Sheet

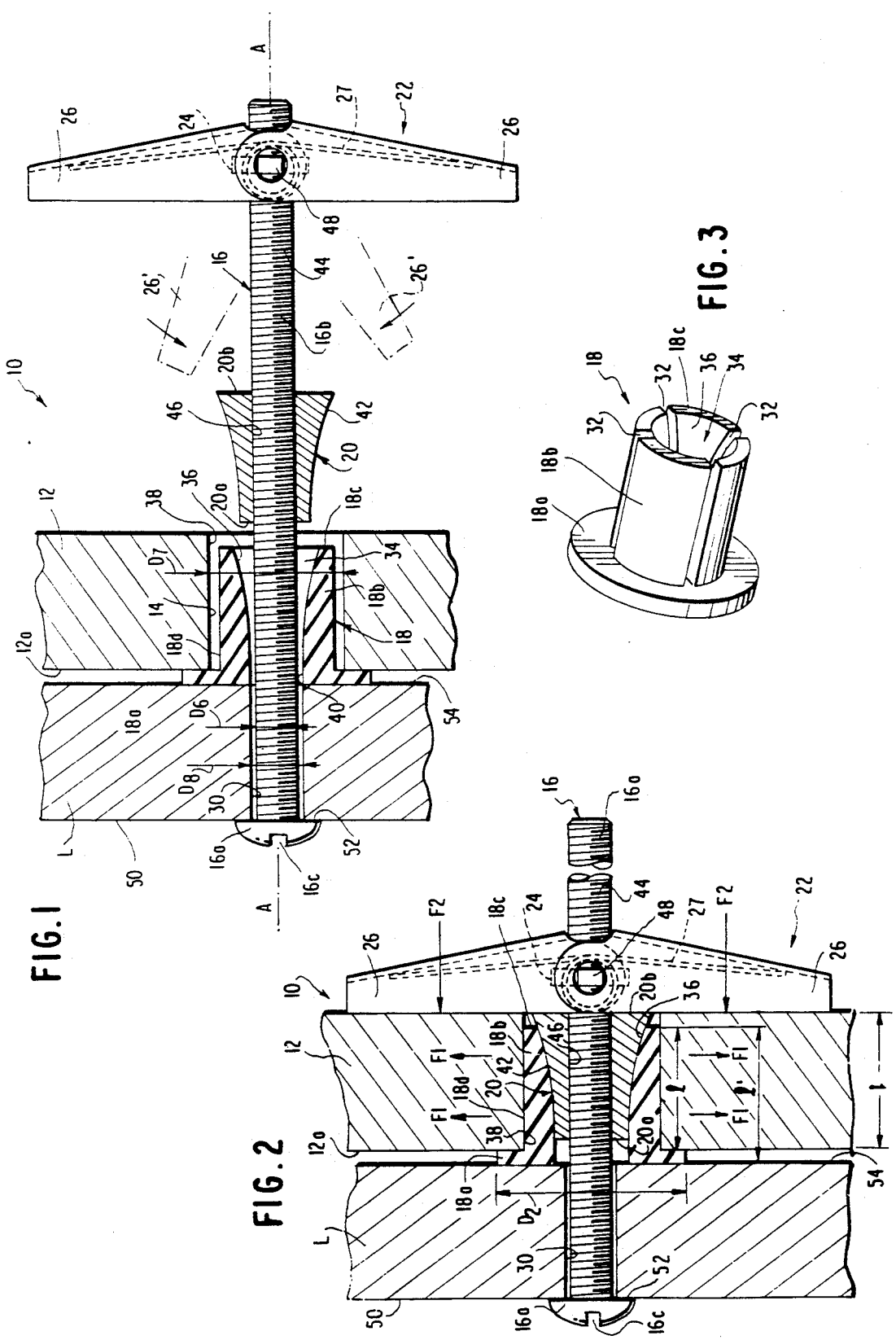

ial and rad# FASTENING BOLT ASSEMBLY PROVIDING BOTH AXIAL AND RADIAL HOLDING FORCES

FIELD OF THE INVENTION

This invention relates to a fastening means for mounting an object to a wall and more particularly to a fastening bolt or a toggle bolt wing nut retaining or fastening device.

Toggle bolts having expandable wing nuts are commonly used for attachment of an object in a blind bore and a vertical wall. Blind bores provide access to the opposite side of the wall not available to the worker to hold and retrieve a nut threaded to the shank of the toggle bolt or fastening bolt. Such structures are commercially available. Such fastening bolts have a radially expandable wing assembly or structure which is retained in a retracted or minimal diameter condition allowing insertion into the bore and then expanded by rotation of the fastening bolt about its axis or by force to cause a pair of diametrically opposite wing members to contact the rear face of the wall to prevent the nut from pulling out through the back of the hole. Typically, the fastening bolt assembly holds the object to the front of the wall by a reaction force set up axially through the radially enlarged wing nut assembly and specifically the diametrically opposed wings contacting the rear surface of the wall radially outward of the blind bore.

Such fastening bolt assemblies having expandable wing nut structures or their equivalent are exemplified by the following U.S. Pat. Nos. 499,444, 1,733,693, 3,248,994, 3,288,014, 4,286,497, 4,657,461 and 5,028,186.

While such fastening bolt assemblies operate satisfactorily to some degree, such fastening bolt assemblies, in some cases, are relatively complicated, provide retention forces which are axial or parallel thereto, fail to ensure centering of the fastening bolt or indeed holding the fastening bolt coaxial with the blind bore during force application.

It is therefore a primary object of the present invention to overcome the problems identified above, and to provide a simplified assembly which centers the fastening bolt fastening through the blind bore of the wall, which supports the fastening bolt during tightening down of the wing nut carried thereby, which provides both radially and axial fastening forces.

It is a further object of the invention to provide such an improved fastening bolt assembly which employs both axial and radial holding forces, which employs a radial holding and centering expandable bushing acting in conjunction with an expansion insert, both concentrically surrounding the shank of the fastening bolt and which may be made of a variety of materials such as rubber, plastic and ductile metal or composites of the same, and which may automatically seal to the blind bore within the wall to prevent liquid transmission through the assembly from one side of the wall to the other.

SUMMARY OF THE INVENTION

The present invention is directed to a fastening bolt assembly providing both axial and radial holding forces for mounting an object having a hole passing therethrough to a wall with opposite front and rear surfaces having a hole passing therethrough alignable with the holes within the wall and within the object. The fastening bolt assembly is comprised of a headed tubular bushing of an outer diameter on the order of that of said hole in the wall. The tubular bushing is insertable in the wall hole. A radial flange is carried on the end of the bushing which acts as a stop against the front surface of the wall. A threaded bolt has a radially enlarged head and a threaded shank extending axially therefrom with the shank insertable within the tubular bushing and with the shank diameter permitting such axial insertion. The shank extends through the aligned holes of the object and the wall blind bore. The tubular bushing is provided with a bore which flares outwardly in a direction away from the flanged end. A tubular expansion insert having an outer periphery which is correspondingly oppositely flared, and generally matching the flared bore of the tubular bushing is concentrically carried by the shank of the threaded bolt and is receivable within the flared bore of the tubular bushing. The bushing has an axial length on the order of the thickness of the wall. A folding wing nut structure having a tapped hole at the center of a trunion nut thereof is threaded to the shank and includes a pair of wings pivoting about axes, radially outward of a tapped bore of the trunion nut. The folding wing nut faces said end of said tubular expansion insert remote from said bushing whereby, rotation of said fastening bolt causes said folding wing nut structure to move axially on said threaded shank and to thereby force the expansion insert to move internally of the tubular bushing thereby radially expanding the bushing to cause a radial frictional locking force to be exerted on the blind bore within the wall. Simultaneously, the wings of the folding wing nut structure press against the rear surface of the wall to exert an axial holding force on said object captured between the radially enlarged head of the bolt and the front surface of said wall.

The tubular bushing may be slotted longitudinally over the length of the bushing within the blind hole. The bushing and insert may be formed of molded plastic and preferably an elastomeric material. Alteratively, the bushing may be formed of rubber to effect a liquid proof seal of the blind bore. Both the bushing and insert may be formed of a soft, ductile metal such as lead.

The diameter of the flange of the bushing may be slightly larger than the wall blind bore diameter. The diameter of the expandable radially expandable portion of the bushing as an axial extension of the flange is slightly less than the diameter of the blind bore. The length of the bushing from the flange to the free end of the bushing remote from the flange may be approximately equal to the thickness of the wall and preferably slightly less than that thickness. The bore of the bushing is sized to freely accommodate the bolt while centering the same and the bore flares outwardly from the flanged end towards the opposite end thereof. The expansion insert has an axial bore sized slightly larger than that of the bolt shank, and the outer periphery thereof is flared oppositely to that of the bushing and interfits therewith. The tapered bore of the bushing and the tapered peripheral surface of the outer surface of the expansion insert may be conical. The end of the expansion insert facing away from the bushing may be of the same diameter as the threaded trunion nut of the folding wing structure.

BRIEF DESCRIPTION OF THE DRAWINGS

FIG. 1 is a vertical sectional view of a fastening bolt assembly forming a preferred embodiment of the invention with the parts positioned for mounting to a bore within a vertical wall.

FIG. 2 is a similar vertical sectional view, with the fastening bolt tightened down, with the expansion insert driven into the interior of the bushing, and the folding wing nut wings in abutment with the rear surface of the wall.

FIG. 3 is a perspective view of the radial holding and centering expandable bushing forming one element of the assembly of FIGS. 1 and 2.

DESCRIPTION OF THE PREFERRED EMBODIMENT

The drawings show a fastening bolt assembly indicated generally at 10 which provides both axial and radially holding forces for mounting an object L in this case, a flat plate, constituting a load against the front surface 12a of a vertical wall 12 which may be of plaster board or other material. The load L is provided with a hole or bore 30 which has a diameter $D_8$ slightly larger than the diameter $D_6$ of a threaded shank 16b of a fastening bolt, indicated generally at 16, and which shank passes therethrough. Bolt 16 has an enlarged head 16a at one end of the threaded shank. That head 16a includes a transverse slot 16c to receive the blade of a screwdriver (not shown) which effects rotation of the fastening bolt about its axis A, which is also constitutes the axis of the fastening bolt assembly 10. The fastening bolt assembly 10 in addition to the fastening bolt 16, is comprised of a radial holding and centering expandable tubular bushing 18, a tubular expansion insert 20, and a folding wing nut structure indicated generally at 22.

The plaster board or other material wall 12, is provided with a blind bore 14 of a diameter $D_7$ which is in excess of fastening bolt shank diameter $D_6$, and which is somewhat larger than the outside diameter of the bushing 18. The radial holding and centering, expandable tubular bushing 18 has a radially enlarged, integral collar or flange 18a which is slightly larger in diameter $D_2$, than the specified wall blind bore diameter $D_7$.

The overall length l' of the bushing is in excess of the thickness t of the plaster board wall 12. The flange or collar 18a acts as a stop to prevent the bushing 10 from passing through the blind bore 14 within the plaster board wall 12 when, once the body 18b of the bushing is inserted into the blind bore 14. The length l of the cylindrical bushing body 18b is equal to or slightly less than the thickness t of the plaster board wall 12. As seen in FIG. 3, the radial holding and centering, expandable, tubular bushing 18 is provided with four radial slots 32, spaced equally at 90° to each other to facilitate the radial expansion of the slotted body 18b of the bushing when, the expansion insert 20 is forced interiorally of that member. The slots 32 extend the full length of body 18b. Alternatively, where the bushing is formed of a ductile metal the body 18b may be free of slots 32.

In that respect, the relatively small diameter bore 40 within the flange or collar 18a of the bushing 18 which matches that at $D_8$ for the board L and which is slightly larger than the shank diameter $D_6$ of the threaded fastening bolt 16, flares outwardly at 36 in bushing body 18b, in the direction toward the end 18c of the body 18b remote from the flange or collar 18a. This creates a frusto-conical cavity 34 which acts to receive expansion insert 20. The cylindrical, peripheral outer surface 18d of the body 18b of the bushing faces and is in the relaxed condition, radially spaced from the cylindrical surface 38 of the plaster board 12 formed by blind bore 14.

The tubular expansion insert 20 is of frusto-conical form having a forward, small diameter end 20a, and a radially enlarged, rear end 20b, an axial bore 46, and an outer outwardly and rearwardly flared or tapered peripheral surface 42. That tapered surface 42 is slightly curved and mirrors the slightly curved rearwardly and outwardly flared surface 34 of body 18b of the tubular bushing 18. Both the bore 36 within the tubular bushing, and the surface of the axial bore 46 of the tubular expansion insert 20, are smooth. Further, the diameter of axial bore 40 within the tubular expansion insert 20, is slightly larger than the shank diameter $D_6$ of the threaded bolt 16. As a result, neither the radial holding and centering expandable, tubular, bushing 18 or the tubular expansion insert 20 is effected by the threads 44 on the outer periphery of the threaded bolt shank 16b.

As seen in FIG. 1, the folding wing nut structure 22 is comprised of a trunion nut 24 having pivotally mounted thereto by pivot pins or like pivot connections 48, a pair of elongated wings 26. The wings 26 may be pivoted towards each other and the axis A of the assembly 10 or, spring biased by spring 27 to an outwardly, oppositely oblique splayed position as shown in FIG. 1. As may be appreciated, by pivoting the folding wings 26 from the full line position shown in FIG. 1 to the dotted line position, the folding wing nut structure 22 can be inserted into the blind hole 14 and readily passed therethrough threaded to bolt 16 in succession with the tubular expansion insert 20. The body 18b of the tubular bushing can be inserted into the blind hole to the extent of abutment of the collar or flange 18a against the front surface 12a of the wall 12.

The makeup of the folding wing nut structure 22, is not unique to this invention and may constitute a wing nut structure similar or identical to that shown in U.S. Pat. No. 4,116,104 or U.S. Pat. No. 4,286,497 (listed above). The content of those patents are incorporated specifically by reference herein.

As is apparent from FIG. 1, the positioning of the components of assembly 10, and the load L is effected in a similar manner to the patents referred to above. Specifically, if the load L is not supplied with the appropriate throughhole as at 30, one may be drilled having a diameter $D_8$ slightly in excess of the diameter $D_6$ of the threaded shank 16b of bolt 16. Further, a blind hole or bore 14 must be drilled into the plaster board wall 12 of a much larger, diameter $D_7$. At that point, in succession the load L is placed on the shank 16b with its front surface 50 in abutment with the flat surface 52 of the bolt head 16a and next, the radial holding and centering expandable, tubular bushing 18 is mounted to the fastening bolt 16 by being slid over the threaded outer periphery of shank 16b with the collar 18a proximate to, and facing the rear surface 54 of the load L. The tubular expansion insert 20 is then slid onto the threaded shank 16b of bolt 16 such that the small diameter end 20a of the tubular expansion insert faces the rear end 18d of the radial holding and centering expandable, tubular, bushing 18. Lastly, the folding wing nut structure 22 is threaded onto the threaded bolt shank 18b via the tapped hole or bore 56 within the bolt shank 18b trunion nut 24. With that assembly completed, all that is necessary to permit the assembly 10 to mount the load L to the plaster board wall 12 is the folding of the wing nut structure 22 wings 26 towards each other from the full line position shown at 26 to the dotted line position 26', and the threaded bolt end remote from the head 16a inserted into the blind bore 14 within wall 12. After passage of the folding wing nut structure 22 through the blind hole 14, the arms can be expanded, by release of the biasing spring 27. Insertion is continued until the tubular expansion insert 20 passes fully through the blind bore 14 of wall 12, and the collar or flange 18a of the radial holding and centering expandable, tubular, bushing 18 abuts against the front surface 12a of the plaster board wall 12. The rear surface 54 of the load L will be in abutment with the front surface of the collar or flange 18a. Further, bushing 18 of the assembly 10 acts to center and hold the fastening bolt 16 while the fastening bolt is tightened down to draw the trunion nut 24 of the folding wing nut structure 22 from right to left (FIG. 1). As this occurs, the trunion nut has its front surface, drawn against rear end 20b of the tubular expansion insert 20. Continued rotation of the fastening bolt 16 by a screw driver blade within the transverse slot 16c of the head 16a of the fastening bolt 16, causes the front end 20a of the tubular expansion insert 20 to enter cavity 34 of bushing 18 whereupon, the mirror image flared surface 42 of the tubular expansion insert 20 and the flared bore surface 36 of the tubular bushing 18 meet. Since these surfaces are oppositely flared, this forces a radial movement of the four sectors of body 18b of the bushing as seen in FIG. 2 under the compressive force of the trunion nut 24 as it continues to move from right to left along the threaded bolt shank 16b. Simultaneously, the radially outer ends of the oblique wings 26 of the folding wing nut structure 22 approach the rear surface 12b of the plaster board wall, and axial forces are extended through the assembly 10 against the plaster board material wall 12. The elements of the assembly 10 are compressed toward each other along with the load L. The thin collar or flange 18a compresses such that the rear surface 54 of the load L comes into abutment or near abutment with the front surface 12a of wall 12.

As may be appreciated, the tubular expansion insert 20 can be made from a ductile or non-ductile material. It may be made from hard plastic or metal. Preferably, the radial holding and centering expandable, tubular, bushing 18 is made from an elastomeric material such as rubber, and expands radially so as to create radial compression forces $F_1$ acting on the peripheral surface of the blind bore 14. Simultaneously axial forces $F_2$ are set up within the wings 26 of the folding wing nut structure 22 all of which acts to maintain the load in fixed abutment with the front surface 12a of the plaster board wall 12. The radial holding and centering expandable bushing 18 when formed of an elastomeric material such as rubber, may be used in situations where liquid passage through the drilled blind bore 14 is to be prevented. The radial forces $F_1$ exerted on the plaster board material of wall 12 effects an outer seal while, the movement of the tubular expansion insert into cavity 34 and the abutment between the outer periphery 42 of that member and the inner periphery 36 of the bore within the tubular bushing 18 creates an effective inner seal to prevent liquid passage through blind bore 14 of wall 12.

The simplified assembly, therefore provides adequate radial and axial forces to maintain the load L rigidly, fixedly mounted to the face of the apertured plaster board or other material wall 12. Preferably, the diameter of flange 18a is slightly larger than the specified wall hole diameter which in turn is determined by the outside diameter $D_2$ of the radially expandable bushing 18. This diameter $D_2$ in turn is determined by the collapsed diameter of the folding wing nut structure 22. Preferably, the length l of the bushing body 18b should be approximately equal or preferably slightly less than the wall 12 thickness t. The plastic, rubber, ductile metal, composites of the same or other material of expandable tubular bushing 18 may be slotted at 32 to facilitate the radial expansion of the same. Preferably, the large end of the tubular expansion insert 20 is of approximately the same diameter $D_4$ as the threaded trunion nut 24 of the folding wing nut structure 22.

While the present invention has been described and illustrated by means of a single embodiment, it is to be understood that numerous changes and modifications may be made therein without departing from the spirit and scope of the invention as defined by the dependent claims.

What is claimed is:

1. A fastening bolt assembly providing both axial and radial holding forces for mounting an object having a hole passing therethrough to a wall having opposite front and rear surfaces and having a hole passing therethrough alignable with the holes within the wall and within the object, respectively, said fastening bolt assembly comprising:

a flanged tubular bushing including a tubular body having an outer diameter on the order of said blind bore and a length approximately equal to the thickness of said wall and having an axial bore, a thin, radially enlarged flange on one end of said bushing having a diameter in excess of the diameter of the blind bore and acting as a stop when abuting against the wall front surface with the bushing tubular body inserted within said blind bore from the front surface towards the rear surface, a threaded bolt having a radially enlarged head at one end and a threaded shank extending axially therefrom and said threaded shank being insertable through said hole of said object, and through said headed tubular bushing with the shank diameter being less than that of the bore of said tubular bushing, said tubular bushing bore being flared outwardly in a direction away from said flanged end, a tubular expansion insert having an axial bore of diameter in excess of the diameter of said threaded shank and being slidably, concentrically mounted on said threaded shank of said bolt, having an outer periphery which is flared oppositely to that of the flared bore of the tubular bushing body and generally matching the same, and said tubular expansion insert being axially slidable into the flared bore of the tubular bushing, a folding wing nut structure having a trunion nut with a tapped hole in the center thereof threaded on the threaded shank of said fastener bolt, and a pair of wings pivotably coupled to said trunion nut, outwardly of the tapped hole for pivoting about axes such that the wings fold toward each other in the direction of said expansion insert to extend generally parallel to the axes of the fastener bolt and on opposite sides of the threaded shank thereof, said trunion nut facing the end of the tubular expansion insert remote from said bushing, whereby; rotation of the fastening bolt causes the folding wing nut structure to move axially on said threaded shank and to thereby force the expansion insert to move internally of the tubular bushing to radially expand the bushing and cause a radial frictional locking force to be exerted by the tubular bushing on the blind bore within the said wall, and the wings of the folding wing nut structure to press against the rear surface of the wall and to exert an axially holding force on an object captured between the radially enlarged head of the bolt and the front surface of said wall.

2. The fastening bolt assembly as claimed in claim 1, wherein said tubular bushing includes a plurality of circumferentially spaced slots extending longitudinally over the length of the bushing body within the blind hole.

3. The fastening bolt assembly as claimed in claim 1, wherein at least one of said bushing and insert is formed of an elastomeric material.

4. The fastening bolt assembly as claimed in claim 3, wherein said elastomeric material is rubber and, the said at least one of said bushing and insert effects a liquid proof seal between said fastening bolt assembly and said wall at said blind bore.

5. The fastening bolt assembly as claimed in claim 1, wherein at least one of said bushing and insert is formed of one material of the group consisting of molded plastic, rubber, ductile metal and composites thereof.

6. The fastening bolt assembly as claimed in claim 1, wherein said flange of said bushing is of a diameter slightly larger than the diameter of said blind bore within said wall, whereby the axial forces exerted by the fastening bolt assembly on the object tending to fixedly mount the object to the front surface of the wall, acts to axially compress the thin flange to the extent of causing the rear surface of the object to abut the front surface of the wall radially outward of said blind bore.

7. The fastening bolt assembly as claimed in claim 6, wherein the length of the bushing body from the flange to the end of the body remote from said flange is approximately equal to the thickness of the wall.

8. The fastening bolt assembly as claimed in claim 7, wherein length of said bushing body is slightly less than the thickness of said wall.

9. The fastening bolt assembly as claimed in claim 1, wherein the outwardly and rearwardly flared bore of said tubular bushing body, is conical and outer periphery of the tubular expansion insert is conical matching that of the tubular bushing body bore.

10. The fastening bolt assembly as claimed in claim 1, wherein the axial end of the expansion insert facing away from the tubular bushing is of the same diameter as the threaded trunion nut of the folding wing structure.

* * * * *